(12) United States Patent
Ming et al.

(10) Patent No.: US 7,067,453 B1
(45) Date of Patent: Jun. 27, 2006

(54) HYDROCARBON FUEL REFORMING CATALYST AND USE THEREOF

(75) Inventors: Qimin Ming, Richland, WA (US); Todd Healey, Richland, WA (US); Patricia Marie Irving, Kennewick, WA (US)

(73) Assignee: InnovaTek, Inc., Richland, WA (US)

( * ) Notice: Subject to any disclaimer, the term of this patent is extended or adjusted under 35 U.S.C. 154(b) by 259 days.

(21) Appl. No.: 10/197,618

(22) Filed: Jul. 15, 2002

Related U.S. Application Data (60) Provisional application No. 60/305,389, filed on Jul. 13, 2001.

(51) Int. Cl.
*C01B 3/26* (2006.01)
*B01J 23/58* (2006.01)
*B01J 23/40* (2006.01)
*B01J 23/42* (2006.01)
*B01J 23/46* (2006.01)

(52) U.S. Cl. .......... 502/304; 423/652; 423/653; 423/654; 502/325; 502/326; 502/327; 502/330; 502/332; 502/333; 502/334; 502/335; 502/336; 502/339

(58) Field of Classification Search .......... 502/309, 502/326, 328, 332, 333, 325, 330, 334, 339, 502/304, 327, 335, 336; 423/652
See application file for complete search history.

(56) References Cited

U.S. PATENT DOCUMENTS

| | | | | |
|---|---|---|---|---|
| 4,483,693 A | * | 11/1984 | White et al. | 48/213 |
| 5,268,346 A | * | 12/1993 | Ino et al. | 502/304 |
| 5,559,065 A | * | 9/1996 | Lauth et al. | 502/5 |
| 5,801,114 A | * | 9/1998 | Durand et al. | 502/302 |
| 6,221,280 B1 | * | 4/2001 | Anumakonda et al. | 252/372 |
| 6,238,816 B1 | * | 5/2001 | Cable et al. | 423/652 |
| 6,303,098 B1 | * | 10/2001 | Kramarz et al. | 423/656 |
| 6,429,167 B1 | * | 8/2002 | Maeno et al. | 502/325 |
| 6,497,856 B1 | * | 12/2002 | Lomax et al. | 423/651 |
| 6,623,719 B1 | * | 9/2003 | Lomax et al. | 423/652 |
| 6,630,115 B1 | * | 10/2003 | Kaneeda et al. | 423/213.5 |
| 6,670,303 B1 | * | 12/2003 | Heineke et al. | 502/349 |
| 6,806,225 B1 | * | 10/2004 | Ikeda et al. | 502/326 |
| 2002/0146359 A1 | * | 10/2002 | Lomax et al. | 422/198 |
| 2004/0014600 A1 | * | 1/2004 | Fukunaga | 502/304 |
| 2004/0048741 A1 | * | 3/2004 | Poulston et al. | 502/302 |

FOREIGN PATENT DOCUMENTS

| | | |
|---|---|---|
| DE | 44 27 665 A1 | 2/1996 |
| JP | 5-270802 | 10/1993 |
| WO | WO 00/10704 A1 | 3/2000 |

* cited by examiner

*Primary Examiner*—Wayne A. Langel
(74) *Attorney, Agent, or Firm*—Christensen O'Connor Johnson Kindness PLLC (57) ABSTRACT

The subject invention is a catalyst consisting of an oxide or mixed oxide support and bimetallic catalytically active compounds. The supporting oxide can be a single oxide, such as $Al_2O_3$; it also can be a mixture of oxides, such as $Y_2O_3$ stabilized $ZrO_2$ (YSZ), $Al_2O_3$ with $CeO_2$, $Al_2O_3$ with YSZ and others. The bimetallic compounds, acting as active components, are selected from platinum, and ruthenium, prepared in an appropriate ratio. The catalyst is used in the steam reforming of hydrocarbons to produce hydrogen for applications such as polymer electrolyte membrane fuel cells.

7 Claims, 12 Drawing Sheets

HYDROCARBON FUEL REFORMING CATALYST AND USE THEREOF

CROSS-REFERENCE(S) TO RELATED APPLICATION(S)

This application claims the benefit of prior filed provisional application No. 60/305,389 filed Jul. 13, 2001.

STATEMENT OF GOVERNMENT INTEREST

The U.S. Government has a paid up license in this invention and the right in limited circumstances to require the patent owner to license others on reasonable terms as provided for by the terms of Contract No. DAAD05-99-0-7014, awarded by the U.S. Army, and Contract No. DE-FC36-99GO10452, awarded by the U.S. Department of Energy.

FIELD OF THE INVENTION

The present invention relates to a catalyst comprising an oxide or mixed oxide support and a bimetallic catalyst system comprising catalytically active materials. The supporting oxide can be a single oxide, such as $Al_2O_3$, or a mixture of oxides, such as $Y_2O_3$ stabilized $ZrO_2$ (YSZ), $Al_2O_3$ with $CeO_2$, $Al_2O_3$ with YSZ and others. The metallic materials, acting as active components, are Group VIII metals, such as platinum and ruthenium, with an appropriate ratio.

BACKGROUND OF THE INVENTION

Fuel cells are clean power generators with high-energy efficiency, and are projected to generate a significant amount of total energy consumed in the next three decades. Due to their high power density, quick dynamic response to power demand, low operating temperature, and silent operation, polymer electrolyte membrane (PEM) fuel cells are envisioned for use in both vehicle and residential applications. The projected commercialization of polymer electrolyte membrane fuel cells requires the availability of economic hydrogen sources.

Reforming of various hydrocarbons, such as methanol, natural gas, gasoline, and diesel for the production of hydrogen, is being considered for above-mentioned applications because it offers higher energy density than metal hydride, nano carbon tube, and other types of hydrogen carriers. For fuel cell powered automobiles, gasoline fuel is more likely to be the fuel of choice due to its existing infrastructure of distribution and supply. Likewise, diesel fuel is more favorable for military use and for auxiliary and stand-by power.

Steam reforming and partial oxidation are two major processes of reforming hydrocarbons to produce hydrogen (with main by-products of carbon dioxide and carbon monoxide and possibly methane as an undesired byproduct). Steam reforming is currently the most important natural gas conversion process to produce synthetic gas. It has been estimated that 76% of all hydrogen used comes from steam reforming of natural gas. Partial oxidation can be conducted in three different approaches: autothermal reforming, catalytic partial oxidation, and non-catalytic partial oxidation. Autothermal reforming is actually a hybrid of partial oxidation and steam reforming. Noncatalytic partial oxidation usually requires higher temperatures (over 1000° C.) for a complete conversion than autothermal reforming and partial oxidation. Compared with partial oxidation, steam reforming produces a product with higher hydrogen concentration, thus benefiting the operation of PEM fuel cells.

Nickel supported catalysts (for example $Ni/Al_2O_3$), presently used in the industry as steam reforming catalysts for hydrocarbons, are readily poisoned by very small amounts of sulfur compounds contained in hydrocarbons, such as natural gas, gasoline, and diesel. Poisoning the catalyst causes it to lose its activity. Sulfur removal is essential if steam reforming reaction is conducted with any sulfur bearing hydrocarbon fuel and a nickel supported catalyst. Typically, the sulfur levels need to be reduced to 0.2 ppm or lower. Carbon deposition on nickel catalyst is also particularly problematic when a heavy hydrocarbon fuel, such as gasoline or diesel, is reformed. The carbon deposition on the nickel catalyst degrades catalyst performance by decreasing its activity, selectivity, and durability.

The removal of sulfur compounds from hydrocarbons is usually accomplished by a high temperature hydro-desulfurization (HDS) process in which sulfur-containing hydrocarbon is mixed with a small quantity of hydrogen and passed over a hot bed of catalyst (such as cobalt and molybdenum oxides supported on alumina). Organic sulfur components are reduced to $H_2S$ and hydrocarbons, and subsequently the $H_2S$ produced can be removed by adsorption on a bed of ZnO adsorbent to a level below 0.5 ppm. The optimal temperature for most HDS process is between 350 and 400° C. This temperature range is also suitable for the adsorption of $H_2S$ on a ZnO bed. Thermal cracking of organic sulfur compounds to $H_2S$ at elevated temperature is another high temperature HDS process in which no hydrogen is required.

Low temperature desulfurization adsorption processes are also used for the removal of sulfur compounds. The process does not require hydrogen. The two most widely used adsorbents are activated carbon and molecular sieves. Activated carbon can be chemically impregnated to enhance the adsorption of $H_2S$ and it is acceptable for use in small-scale systems for relatively short time periods. In both cases raising the bed temperatures can reactivate the adsorbents. For larger systems, these methods are impractical because of the large quantities of adsorbent required and problems associated with its reactivation and with disposal of the desorbed sulfur. While the foregoing desulfurization processes are effective, they introduce additional steps into the process of reforming hydrocarbon fuel into hydrogen. These steps increase the complexity of the overall reforming process, thus resulting in a bulky system.

It is therefore an object of the invention to provide an effective catalyst for steam reforming of various hydrocarbons to produce hydrogen for the use of fuel cells.

There are several technical papers published pertaining to the catalytic performance of Ru catalyst during the steam reforming under the presence of sulfur components. Suzuki et al reported that a $Ru/Al_2O_3$ catalyst maintained its high activity for over 24 hours with 0.1-ppm sulfur in the feed, while the conversion decreased to 72.3% after 24 hours using commercial Ni catalyst. With 51-ppm sulfur and using $Ru/Al_2O_3$ catalyst, the conversion of hydrocarbon decreased to 60% after 25 hours. The performance of $Ru/Al_2O_3$ in the presence of 51-ppm sulfur was improved (decreased to 85.5% after 25 hours) with the addition of $CeO_2$ into $Al_2O_3$.

It is also noted that bimetallic Pt—Ru alloy is used as the anode catalyst of polymer electrolyte membrane fuel cells. The Pt—Ru catalysts are usually supported on a high surface area carbon (Vulcan XC72 is one example) with an atomic ratio of 1:1 when it is used as the anode catalyst of PEM fuel cells. In this application, the catalyst is used to catalyze the electrochemical reaction of $H_2=2H^++2e$ at a temperature of about 70–90° C.

With the increasing interest in fuel cells as sources for "clean" energy, there is a need for a catalyst capable of steam reforming various hydrocarbons. The preferred properties of the catalyst include coke resistance when it is used for steam reforming of such fuels as gasoline and diesel, sulfur tolerance when it is used for steam reforming of sulfur containing fuel, such as natural gas, gasoline, and diesel. A sulfur tolerant and coke resistance catalyst is particularly important for on-board reforming of hydrocarbons or portable applications where a highly compact design is required.

SUMMARY OF THE INVENTION

Hydrocarbon fuel reforming catalysts of the present invention are useful in the steam reforming of various hydrocarbons, particularly those heavier hydrocarbons and those containing sulfur compounds, to produce hydrogen for applications such as PEM fuel cells. Exemplary hydrocarbons suitable for reforming using catalysts of the present invention include natural gas, iso-octane, gasoline, surrogate gasoline, retail gasoline, "clean" diesel and diesel. Catalysts of the present invention advantageously sustain their activity during the steam reforming of those hydrocarbons in the presence of sulfur components.

The catalysts comprise an oxide or mixed oxide support and bimetallic catalytically active component. The supporting oxide can be a single oxide, such as $Al_2O_3$, or a mixture of oxides, such as $Y_2O_3$ stabilized $ZrO_2$ (YSZ), $Al_2O_3$ with $CeO_2$, $Al_2O_3$ with YSZ and others. The bimetallic component comprises materials acting as active components selected from metals of Group VIII of the Periodic Table, including iron, cobalt, nickel, rhodium, palladium, osmium, iridium, with platinum and ruthenium being preferred, with appropriate ratio.

The hydrocarbons are converted to hydrogen, carbon dioxide and carbon monoxide, by passing the above-mentioned hydrocarbons and water or steam over the reforming catalysts. Catalysts formed in accordance with the present invention have demonstrated the ability to exhibit sustained activity and selectivity for over 200 hours with 100 ppm sulfur in the hydrocarbon feed.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The hydrocarbon reforming catalysts in current use have poor performance with the presence of organic sulfur. The performance is much worse when the concentration of sulfur is high, for example, a few hundred parts per million (ppm). Steam reforming catalysts in current use are also susceptible to carbon deposition when used for steam reforming of some heavier hydrocarbons, such as gasoline and diesel. The carbon deposition subsequently degrades the catalyst performance by decreasing its activity, selectivity, and durability.

The present invention relates to a bimetallic catalyst supported on an oxide or oxides that can steam reform various hydrocarbons to produce hydrogen. The catalyst is particularly useful for steam reforming of heavier hydrocarbons, such as gasoline and diesel. The catalyst is also useful to reform various hydrocarbons in the presence of sulfur components at levels in excess of 75 ppm and even higher levels in excess of 500 ppm. The catalyst is also suitable for reforming hydrocarbons that have lower levels of sulfur. The ability of the catalyst of the present invention to be able to reform various hydrocarbons having varying levels of sulfur content makes the catalyst particularly versatile, making it useful in many different fuel reforming applications.

As used herein, the phrase "catalytically active" refers to the ability of a particular metal to catalyze the steam reforming reaction of a hydrocarbon.

The metals useful in a catalyst formed in accordance with the present invention are catalytically active with respect to the steam reforming reaction of hydrocarbons. Examples of such metals include platinum and ruthenium. Other catalytically active metals, from Group VIII of Periodic Table, such as iron, cobalt, nickel, rhodium, palladium, osmium, and iridium can also be used in the present invention.

The metals used to prepare the catalysts may be any inorganic or organometallic material that will decompose upon exposure to sufficient heat and/or oxidizing agent to provide metal oxides. Soluble metal compounds that will form solutions from which the compounds can be impregnated onto a solid support, and then subjected to heat decomposition are preferred. Water-soluble metal salts are most preferred. When platinum is one of the metals, dihydrogen hexachloroplatinate is an example of a suitable inorganic metallic soluble compound. When ruthenium is one of the metals forming the bimetallic catalyst, ruthenium chloride is an example of a suitable soluble inorganic metallic compound.

The specific ratio of metals forming the bimetallic catalysts may vary over a wide range. Specific ratios can be chosen by taking into consideration factors such as the effectiveness of the particular metal to achieve the desired reformation reaction with the desired reaction products. One suitable bimetallic catalyst composition employs about 0.1 to 5.0 wt % platinum and about 0.1 to 5.0 wt % ruthenium. For sulfur bearing fuels, a bimetallic catalyst with a high platinum to ruthenium ratio (e.g., greater than 1.0) is preferred. For nonsulfur bearing fuels, a bimetallic catalyst having a high ruthenium to platinum ratio (e.g., greater than 1.0) is preferred. The bimetallic catalyst with a ruthenium to platinum ratio greater than 1 produces reformate gas with a lower methane concentration that is desirable when the reformer is designed for use with a PEM fuel cell.

Supports for the metals include oxides or mixed oxides. Suitable supports will exhibit one or more of the following desirable properties, high surface area, resistance to the temperatures used to reform the hydrocarbons, and mechanical strength to avoid crushing or cracking in a packed bed. Examples of suitable oxides include aluminum oxide, magnesium oxide and calcium oxide. Examples of suitable mixed oxides include yttrium oxide stabilized zirconium oxide (YSZ), aluminum oxide with cerium oxide, aluminum oxide with YSZ and others, such as aluminum oxide with zirconium oxide. When choosing a mixture of oxides consideration is given to the oxygen ion conductance properties of the oxides. Oxides with higher oxygen ion conductance properties are preferred over oxides with lower oxygen ion conductance properties because it is believed that oxides with higher oxygen ion conductance properties better facilitate the reforming reaction. Suitable supports may vary in size and shape depending on the particular application. Cerium may be present in the catalyst in an amount ranging from about 0.1 to 99.9 weight percent.

The bimetallic catalysts of the present invention may be prepared by a number of methods known in the art, such as incipient wetness impregnation, ion exchange, co-precipitations, dry mixing, etc. These methods generally involve steps effective to deposit the catalytically active metal uniformly onto the surface of the support.

The present inventors have observed that when reforming hydrocarbon fuel using catalysts of the present invention, carbon formation on the catalyst was observed. It is believed that this carbon formation is associated with the presence of acid sites on the catalyst. In order to neutralize and reduce the concentration of acid sites on the catalyst, in accordance with the present invention, alkali metals can be added to the catalyst. The addition of an alkali metal to the catalyst assists in carbon removal during steam reforming. The particular alkali metal used is chosen for its ability to neutralize the acidity of the catalyst. The amount of alkali metal used should be selected to provide the desired reduction in acidity of the catalyst and resulting reduction in carbon formation. Introducing about 0.1 to about 5 weight percent alkali metal to the catalyst provides effective neutralization of the acid sites. The amount of alkali metal used can fall outside this range provided the desired neutralization and reduction in carbon formation is achieved. Exemplary alkali metals include potassium, lithium, and sodium.

The alkali metal can be added to the catalyst in a number of different ways. One suitable method is to add a salt solution of the alkali metal to the support prior to impregnating the support with the active metals. The alkali metal can be added in amounts effective to assist in carbon removal during steam reforming. Adding about 1 weight percent alkali metal to the catalyst support has been found to be suitable for assisting in carbon removal during steam reforming.

The following examples illustrate techniques for making bimetallic catalysts of the present invention and their use in steam reforming of both non-sulfur and sulfur bearing hydrocarbon fuels.

While the preferred embodiment of the invention has been illustrated and described, it will be appreciated that various changes can be made therein without departing from the spirit and scope of the invention.

EXAMPLE 1

Preparation of Catalyst ITC-2

Catalyst ITC-2 was prepared by dipping 19.5 g granular alumina $Al_2O_3$ (particle size between 500 and 710 um) into 17.5 g aqueous $H_2PtCl_6$ solution containing 3.8 weight percent platinum, allowing it to adsorb for one hour in air, and then drying at 110° C. overnight.

The resulting particles are further impregnated by dipping into 14.3 g aqueous $RuCl_3$ solution containing 0.19 weight percent ruthenium. The particles are allowed to absorb the solution for one hour in air, and then dried at 110° C. for two hours. This procedure is repeated once. The resulting material was calcined at 400° C. for one hour.

EXAMPLE 2

Preparation of Catalyst ITC-3

An aqueous solution was prepared by dissolving 25.0 g $Ce(NO_3)_3.6H_2O$ in 25.0 cc deionized water at room temperature with stirring. The resulting solution has about 20 weight percent $CeO_2$.

The support of ITC-3 catalyst was prepared by dipping 20.0 g granular $Al_2O_3$ (particle size between 500 and 710 um) into 26.3 g of the above prepared solution, then drying at 120° C. overnight. The resulting material was then calcined for one hour each at 600 and 850° C., respectively.

The ITC-3 catalyst was prepared in a method similar to that in Example 1. The above support material was dipped in 16.4 g $H_2PtCl_6$ aqueous solution containing 3.8 weight percent Pt, allowed to absorb the solution for one hour in air, then dried at 110° C. overnight. After this, 15.3 g Ru solution (0.19 weight percent) was added to 25.6 g of the above prepared material and the solution was allowed to absorb for one hour in air and thereafter dried at 110° C. for two hours. This procedure was repeated one more time. Finally, the sample was calcined for one hour at 400° C.

EXAMPLE 3

Preparation of ITC-3B and ITC-3C Catalysts

The cerium aqueous solution was prepared according to Example 2. The support material of catalysts ITC-3B and ITC-3C was prepared in a manner similar to that described in Example 2. 50.0 g $Al_2O_3$ (300–500 μm) was dipped in 59.0 g $Ce(NO_3)_3$ solution. The resulting material was dried at 120° C. overnight, and then was calcined one hour each at 600 and 850° C. respectively. The resulting $Al_2O_3/CeO_2$ grain was used as support to make the catalyst.

A bimetallic Pt—Ru aqueous solution was made by mixing appropriate amounts of Pt ($H_2PtCl_6$) and Ru ($RuCl_3$) solutions. The concentration of Pt is 0.75 weight percent and Ru is 0.25 weight percent in this solution.

The ITC-3B catalyst was prepared by adding 16.0 g of the Pt—Ru solution (0.75 weight percent Pt, 0.25 weight percent Ru) to 23.0 g $Al_2O_3/CeO_2$ material prepared above, allowing the support to adsorb the solution for one hour and then drying at 110° C. for two hours. Finally, the sample was calcined at 400° C. for one hour. The resulting catalyst ITC-3B has a Pt concentration of 0.51 weight percent and a Ru concentration of 0.17 weight percent, with total metal loading of 0.68 weight percent.

ITC-3C was made by further impregnating ITC-3B with Pt—Ru solution an additional time, yielding a catalyst with Pt loading of 0.9 weight percent and Ru loading of 0.3 weight percent. The total metal loading of ITC-3C is 1.2 weight percent.

EXAMPLE 4

Preparation of Catalyst ITC-6

Catalyst support $Al_2O_3/CeO_2$ was prepared according to Example 2. Preparation of bimetallic Pt—Ru catalyst was made by first impregnating support material with $H_2PtCl_6$ solution (Pt=2.0 weight percent) followed by drying at 150° C. for 30 minutes and calcination at 600° C. for one hour. The catalyst was then impregnated by $RuCl_3$ (Ru=2.0 weight percent) solution followed by drying at 150° C. for 30 minutes and calcination at 600° C. for one hour. The resulting catalyst has Pt concentration about 1.6 weight percent and Ru concentration of 1.6 weight percent. The total metal loading is about 3.2 weight percent. This catalyst is designated ITC-6.

EXAMPLE 5

Alkali Metal Addition Preparation of Catalyst ITC-3B with Addition of Alkali Metal The alkali metal KCl solution was prepared by dissolving 2.0 g KCl salt into 100 cc-deionized water. The resulting solution has a concentration of about 1 weight percent K ion.

About 9.2 g of KCl above solution was added into about 14.0 g of $Al_2O_3/CeO_2$ catalyst support prepared according to Example 2. The mixture was dried at 120° C. for one hour. Then about 9.7 g Pt—Ru solution (0.75 weight percent Pt, 0.25 weight percent Ru) was added to the above resulting material. The Pt—Ru solution was allowed to adsorb onto the catalyst support for one hour and then dried at 110° C. for two hours. Finally, the sample was calcined at 400° C. for one hour.

EXAMPLE 6

Iso-Octane Reforming

Steam reforming reactions were conducted in a micro packed bed reactor. Typically, about 3.0 g of the subject reforming catalyst was packed in a ½ inch stainless steel tubular reactor with a thermocouple inserted in the bottom of the tube. The catalyst was activated by reducing with pure hydrogen (100 sccm) at 600° C. for 3 hours, even though catalysts show significant reforming activity without reduction procedure. Liquid hydrocarbon and water were pumped by two HPLC (Waters 590) pumps and vaporized in a pre-heater, and then fed into the catalyst bed at atmospheric pressure. The steam/C ratio was varied for different hydrocarbons. The temperature of the catalyst bed was set at 800° C. and maintained using a temperature controller. Sulfur-containing fuel was prepared by adding 1,4-thioxane ($C_4H_8SO$) to the iso-octane. Product gas composition was determined by GC (SRI 8160C) equipped with both TCD and FID. Lead acetate paper was used to detect the presence of $H_2S$ in the reformate. The dry gas flow rate was measured by DryCal flow meter.

Figure 1:
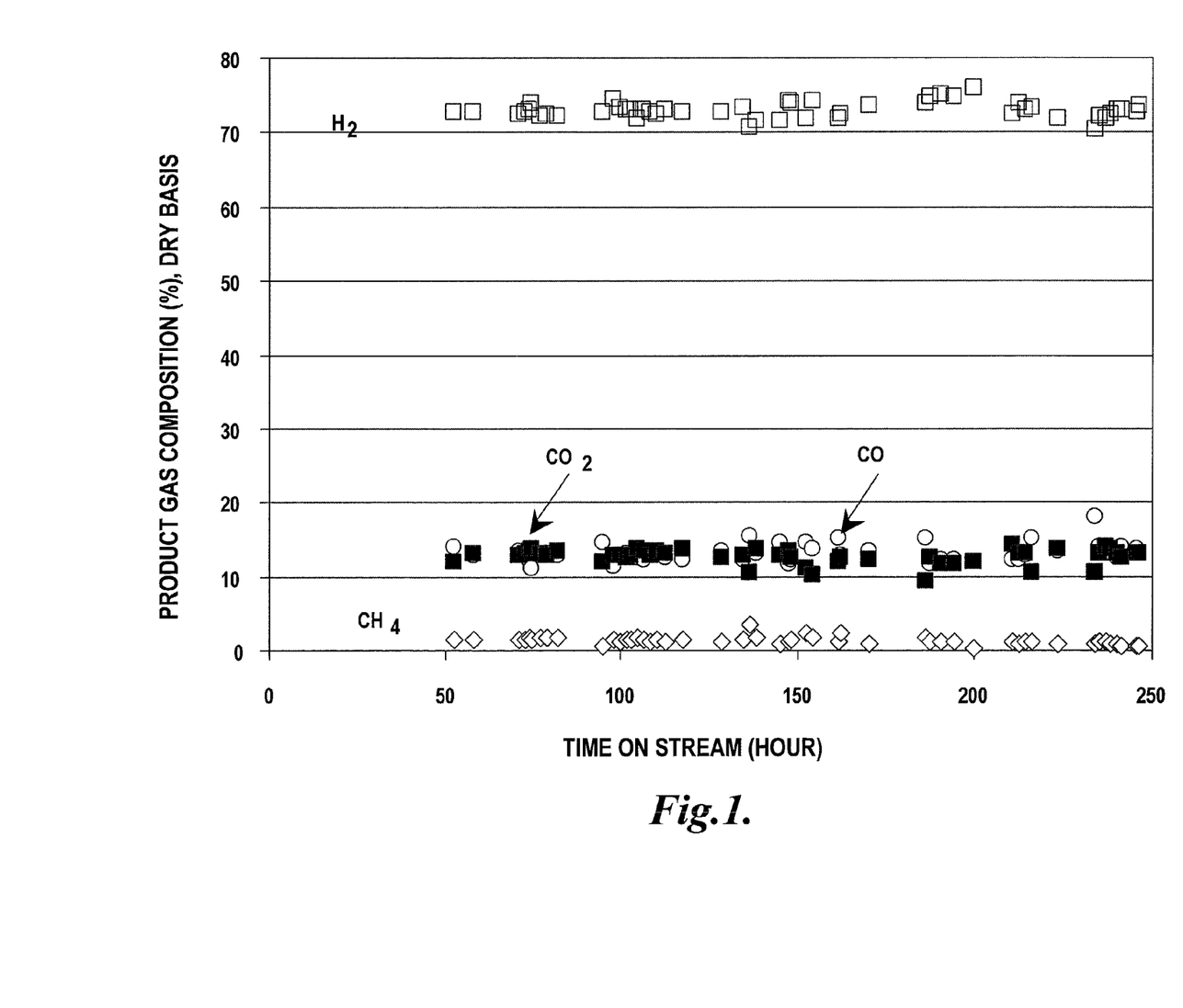
FIG. 1 graphically illustrates the product gas composition resulting from steam reforming of iso-octane without sulfur using ITC-3B.

Catalyst ITC-3B was used to reform iso-octane with steam. The ratio of $H_2O/C$ was 3.5 and the iso-octane feed rate was 0.11 g/min. The catalyst showed no deactivation after 230 hours of testing. The product gas composition is illustrated in FIG. 1.

For 230 hours of continuous testing, the catalyst maintained its catalytic activity and stability. The concentration of $CH_4$ was about 1.5% during the 230 hours of nonstop testing, while hydrogen concentration was maintained at about 70%.

Figure 2:
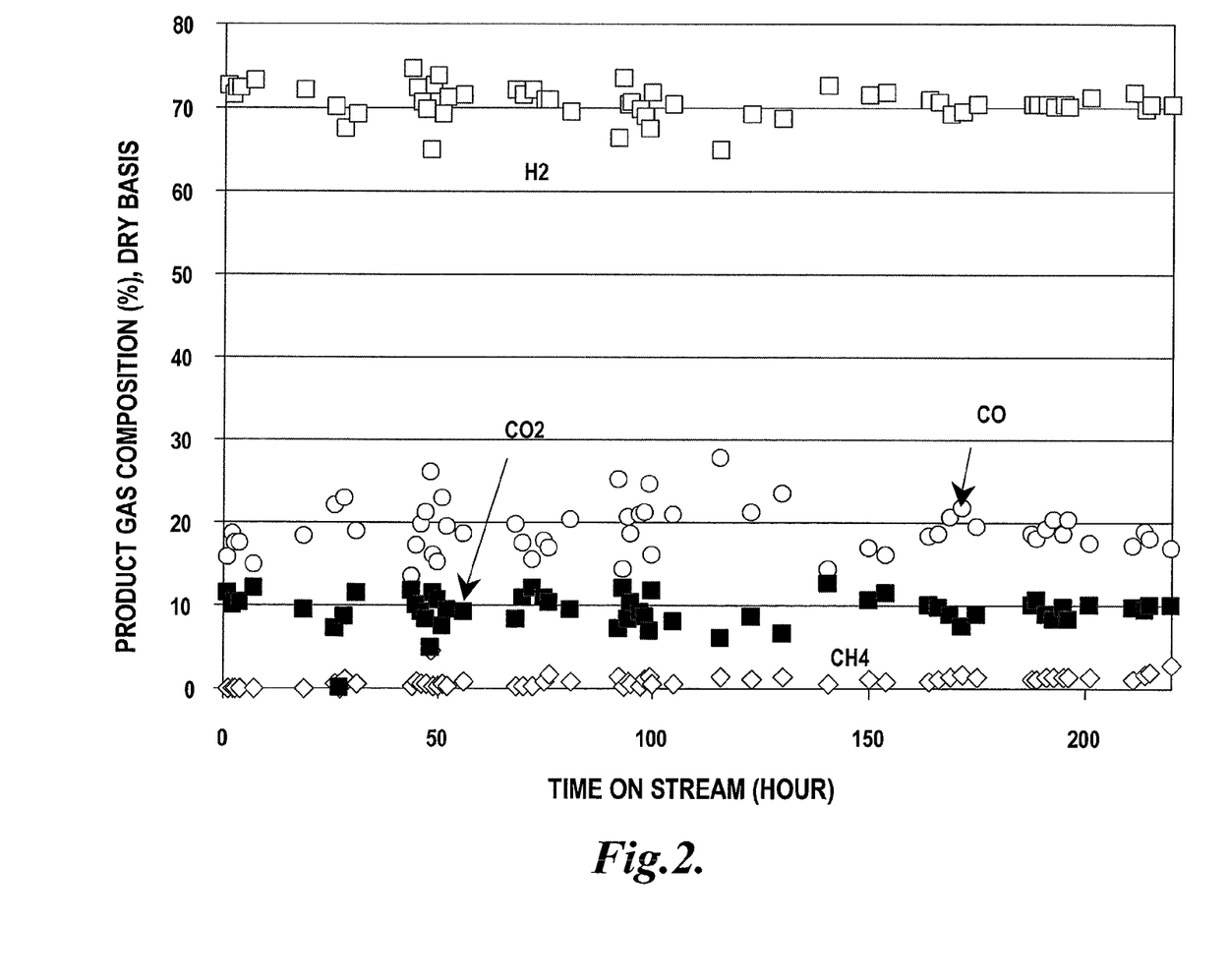
FIG. 2 graphically illustrates the results of steam reforming of iso-octane containing 100 ppm sulfur for over 200 hours using ITC-3C.

The results of steam reforming iso-octane with 100 ppm sulfur for over two hundred hours using 5.0 grams of ITC-3C are shown in FIG. 2. The ratio of $H_2O/C$ was 4.0 and the iso-octane flow rate was 0.11 g/min. The concentration of hydrogen remained at about 70% (on dry basis) for the duration for the test indicating that the catalyst maintained its high selectivity. The organic sulfur component added to the fuel was converted to $H_2S$, as detected by lead acetate paper shortly after the reaction started.

This example illustrates how a catalyst formed in accordance with the present invention effectively reforms a hydrocarbon fuel containing 100 ppm sulfur.

Figure 3:
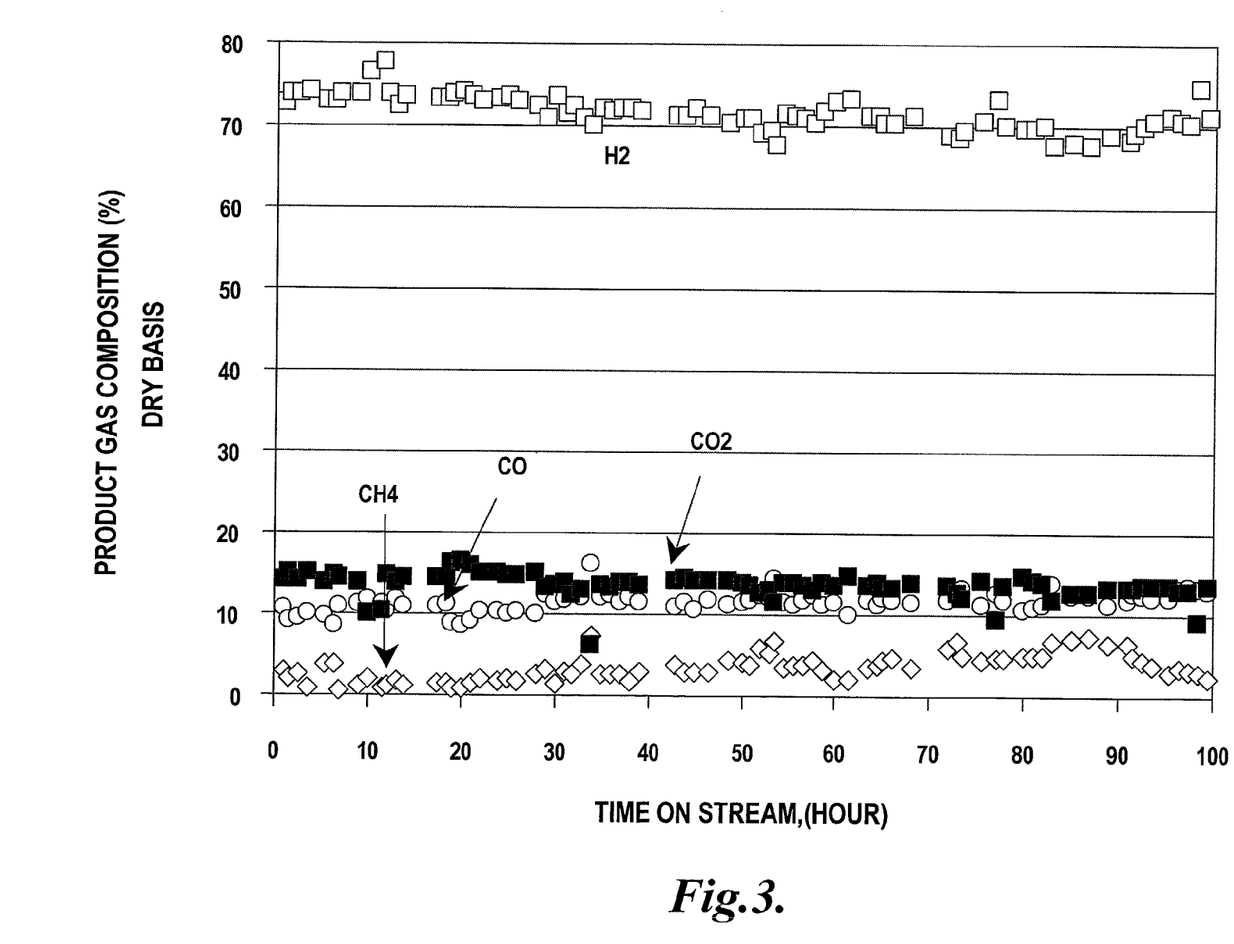
FIG. 3 graphically illustrates the product gas compositions resulting from steam reforming of iso-octane containing 1000 ppm sulfur using ITC-3.

Three grams of ITC-3 was used to steam reform iso-octane with 1,000 ppm sulfur for about 90 hours. The ratio of $H_2O/C$ was about 4.0 and the feed rate of iso-octane was 0.1 g/min. The product gas compositions are illustrated in FIG. 3. The concentration of hydrogen remained at about 70% for the duration of the test indicating that the catalyst maintained its activity.

Figure 4:
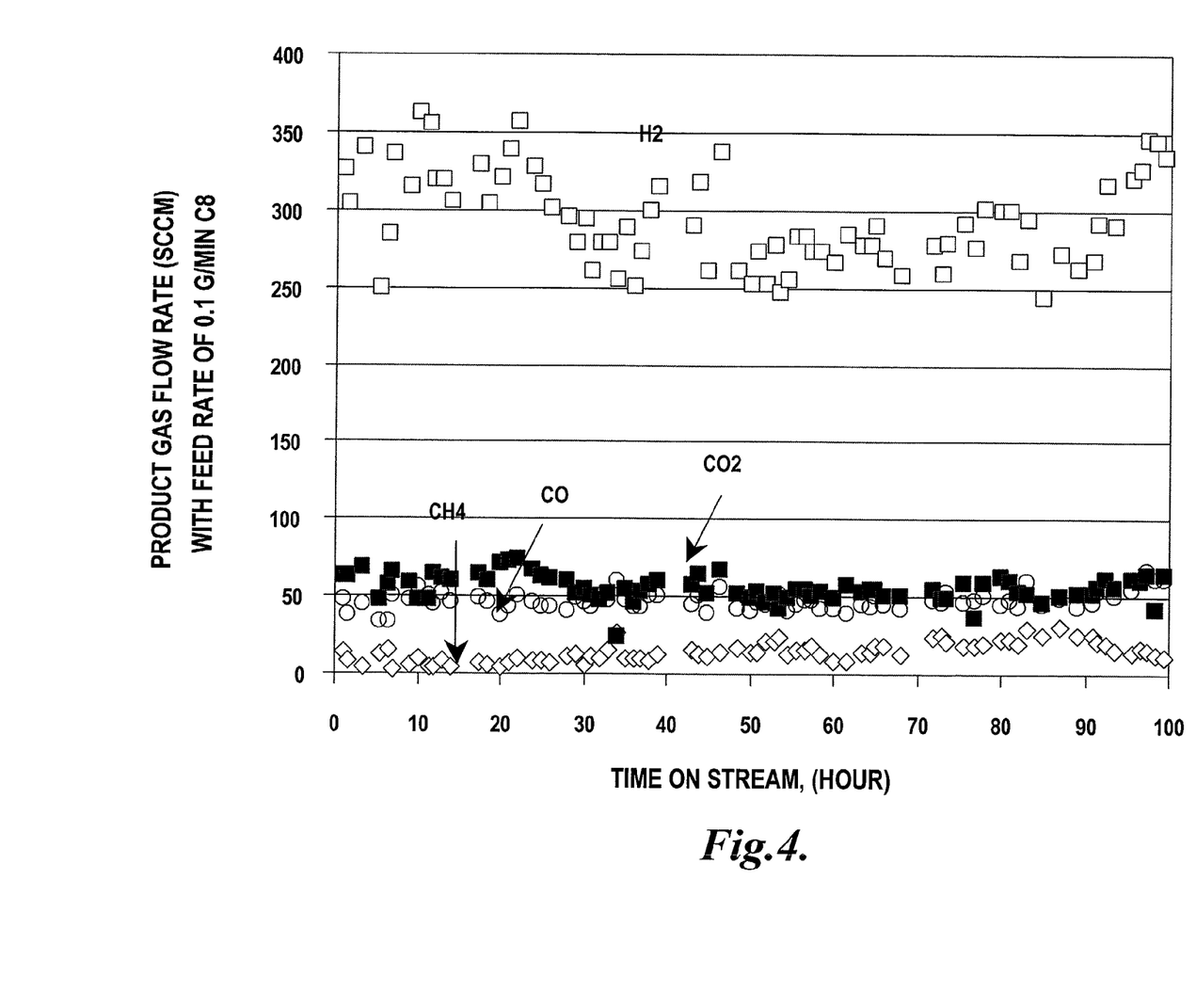
FIG. 4 graphically illustrates the product gas flow rates resulting from steam reforming of iso-octane containing 1000 ppm sulfur with ITC-3.

The sustained performance of the catalyst after breakthrough of $H_2S$ from the catalyst bed indicates that the catalyst is sulfur tolerant. The production rate of hydrogen and other gasses is plotted in FIG. 4 for the constant feed rate of 0.1 g/min iso-octane. Three grams of the catalyst ITC-3 were employed. The ratio of $H_2O/C$ was about 4.0. The average hydrogen production remained at about 300 cc per 0.1 g fuel throughout the 100 hour period indicating that a sustained, constant conversion rate was obtained.

EXAMPLE 7

Methane $CH_4$ Reforming

Figure 5:
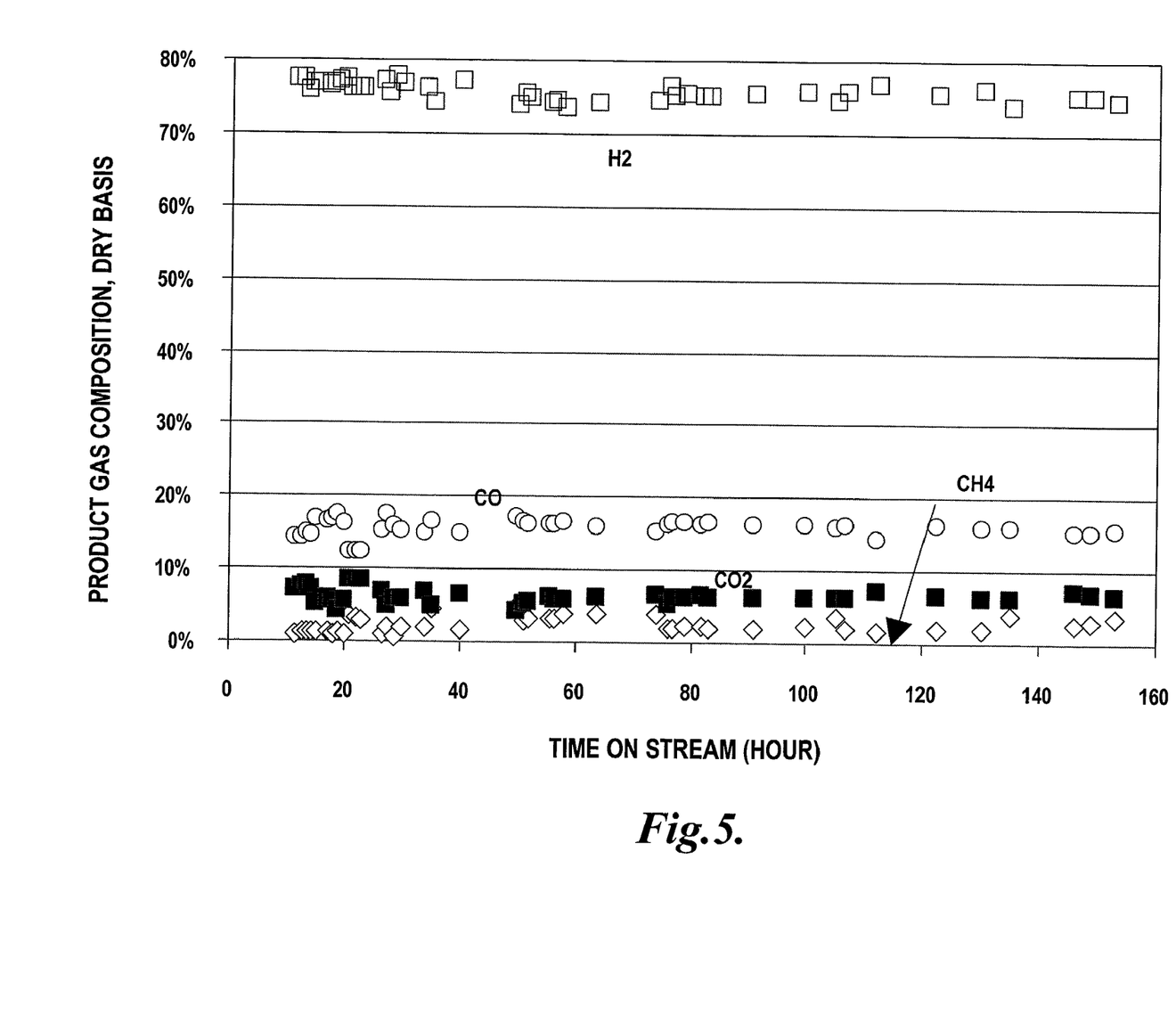
FIG. 5 graphically illustrates the results of steam reforming of methane using ITC-3 catalyst.

Several different catalysts have been tested for the steam reforming of methane, a major component of natural gas. Among them, ITC-3, ITC-3B, and ITC-3C showed high catalytic activity and stability. FIG. 5 shows the product composition for a test using 1.4 grams of ITC-3 catalyst. The test was conducted for 153 hours and was terminated due to leakage of the reactor tube. The catalyst was not deactivated and no coke was observed on both catalyst and reactor.

The reaction temperature was about 760° C. with $CH_4$ feed rate of 300 ml/min and water feed rate of 0.662 g/min, yielding $CH_4$ GHSV=12,000 $hr^{-1}$ and $H_2O/CH_4$ ratio of 3. During the entire test period, the $CH_4$ concentration was less than 4%, while $H_2$ was over 70%.

In order to decrease the loading amount of metal, a modified catalyst ITC-3B was tested for steam reforming of methane under the same conditions. This test was terminated after 67 hours on stream. As with the iso-octane tests, this modified catalysts shows almost the same performance in reforming methane as ITC-3. However, it only has about one-fifth metal loading of ITC-3.

EXAMPLE 8

Figure 6:
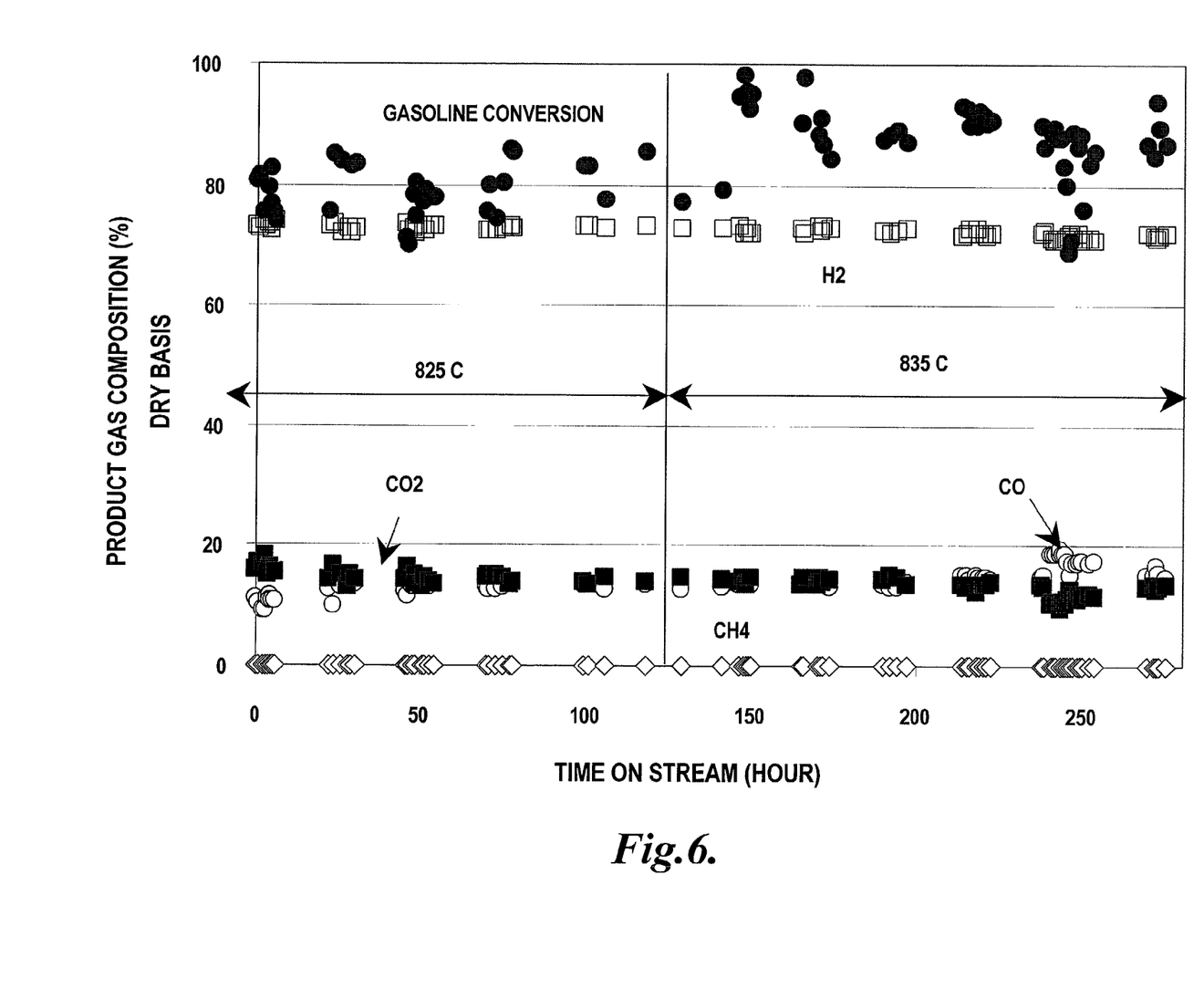
FIG. 6 graphically illustrates the results of steam reforming of no sulfur gasoline using ITC-6.

Gasoline Reforming 3.1 grams of the catalyst ITC-6 was tested for steam reforming of no sulfur gasoline obtained from Chevron Phillips Chemicals. The gasoline contains >55% paraffinic, <10% olefinic, <35% aromatic hydrocarbons. FIG. 6 shows a test result of steam reforming of gasoline. The test lasted for 283 hours with 246 hours continuously. The feed rate of the gasoline varied from 0.18 to 0.30 g/min. and the feed rate of water was 1.0 g/min. The test was started at a lower temperature (700° C.) for 3 hours and then 750° C. for 2.5 hours. The conversion of gasoline is not completed at these temperatures, since oily product was observed in the condensed water. Therefore, we increased the temperature to 825° C. The CO concentration was low at the beginning due to low temperatures (700–750° C.). After 146 hours on stream, the temperature was increased further to 835° C. The percent conversion of gasoline was increased, while no significant changes of the product gas composition ($H_2$, $CH_4$, CO, and $CO_2$) were observed. The product gas composition was about 72% $H_2$, 14% CO, and 14% $CO_2$. No methane was generated during the entire testing period. The variation of both conversion and product gas composition at the about 250 hours are due to the change in $H_2O/C$ ratio.

Figure 7:
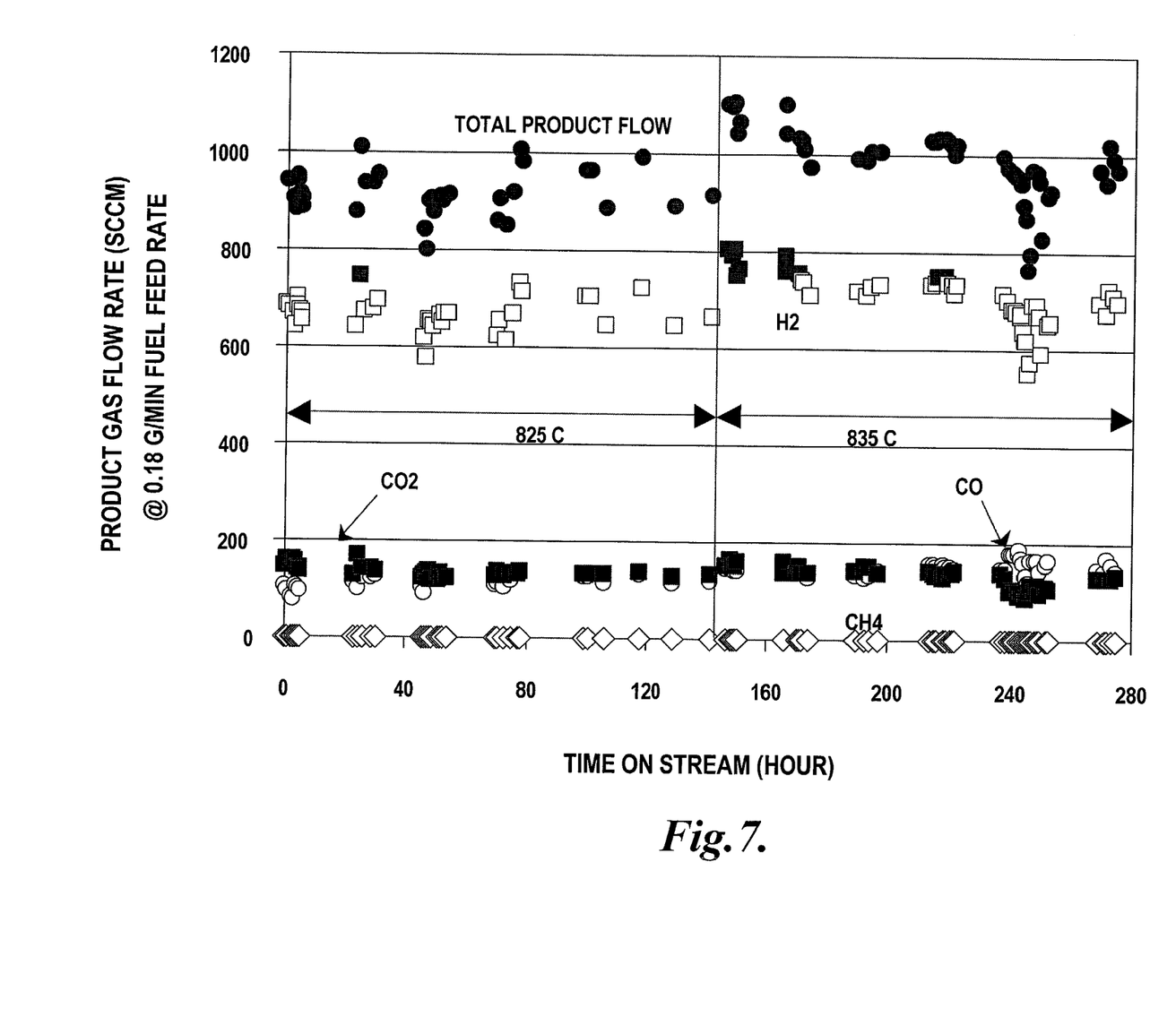
FIG. 7 graphically illustrates the product gas flow rates resulting from the steam reforming of no sulfur gasoline using ITC-6.

FIG. 7 shows the product gas flow rates for the same test. Since the gasoline feed rate was changed during the test period, the flow rates were normalized at a constant feed rate of 0.18 g/min. At 825° C., the total product gas flow rate was about 900 sccm, while a total of about 1000 sccm was obtained at temperature of 835° C.

Figure 8:
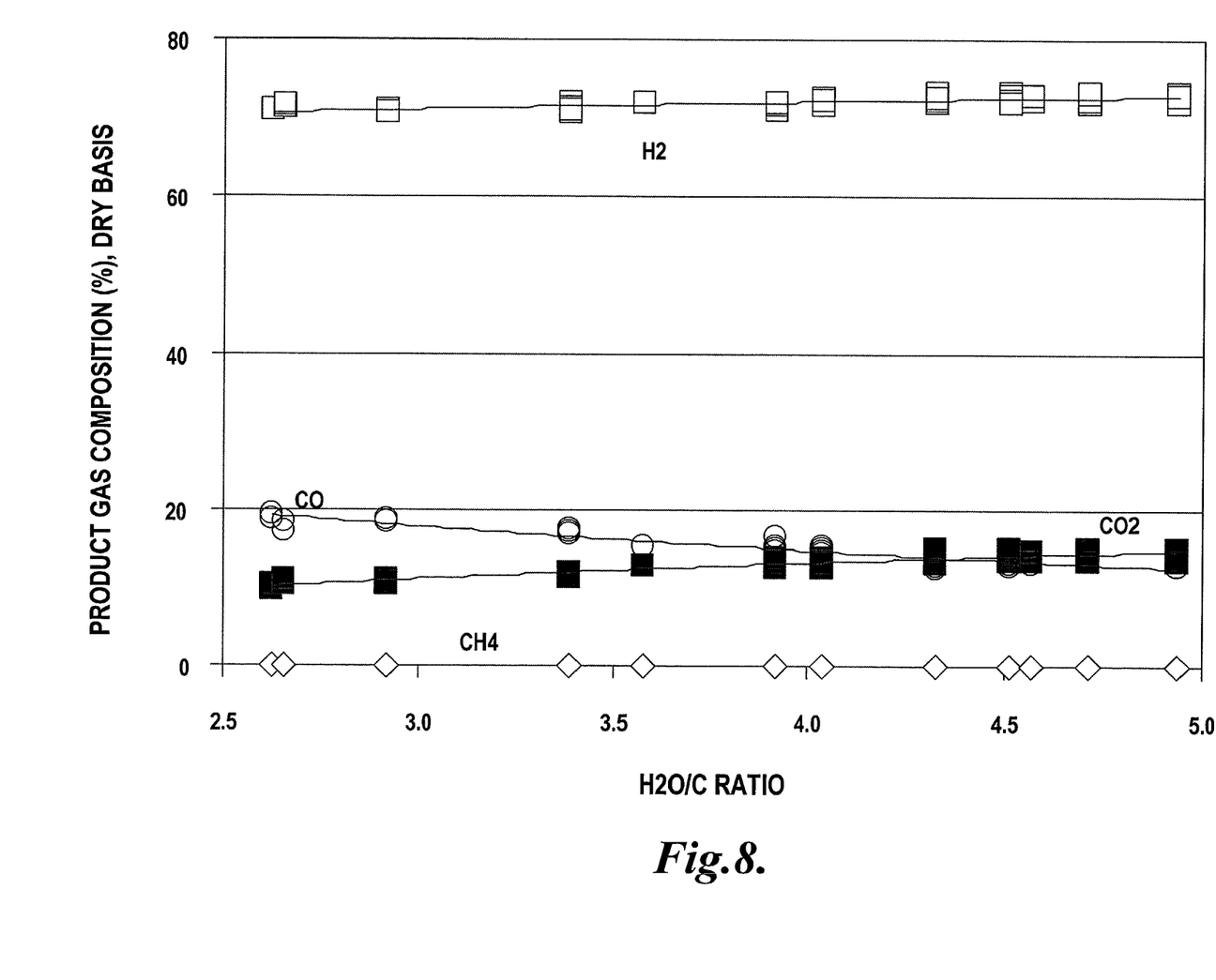
FIG. 8 graphically illustrates the impact of the ratio of water to carbon on the product gas composition during steam reforming of no sulfur gasoline using catalyst ITC-6.

FIG. 8 shows the impact of $H_2O/C$ on the product gas composition during steam reforming of gasoline. This was done by changing the feed rate of gasoline, while fixing the feeding rate of water at 1.0 g/min. Temperature was 835° C. As expected, the concentration of CO decreased as $H_2O/C$ increased. The excess steam in the system forces the reaction toward the direction of yielding higher $CO_2$ and $H_2$.

EXAMPLE 9

Retail Gasoline Reforming

Figure 9:
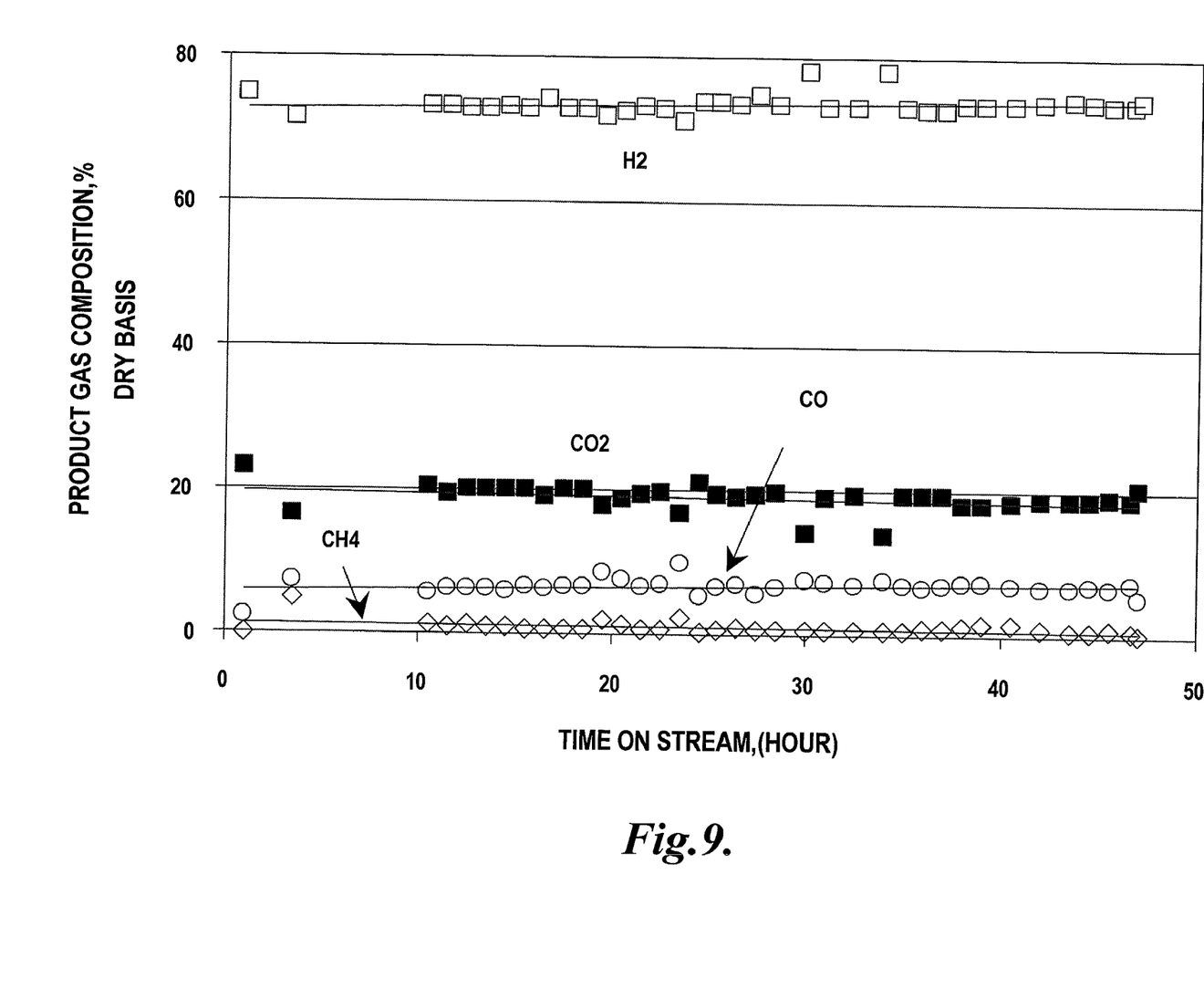
FIG. 9 graphically illustrates the results of steam reforming of retail gasoline using ITC-3.

The catalyst ITC-3 was used for the test of steam reforming of retail gasoline. Retail regular grade gasoline was obtained from Citgo gas station. The results of testing of our ITC-3 catalyst with retail gasoline are shown in FIG. 9. 3.0 grams of ITC-3 were used and the gasoline feed rate was about 0.12 g/min. Gasoline normally contains some sulfur compounds in concentrations ranging from 50 to 300 ppm. During the entire testing period, the catalyst maintained its high selectivity and activity. The product hydrogen concentration was above 70% (dry basis). The low CO concentration for the test was a result of a high steam/C ratio (=6.6). The test was conducted intermittently for 50 hours without any noticeable deactivation of the catalyst. A wide range (from 2.6 to 5) of $H_2O/C$ ratio was also used to reform the gasoline. At reaction temperature of 800° C., a low $H_2O/C$ ratio of 2.6 resulted in an incomplete gasoline conversion to $C_1$ product and coke formation. A typical gasoline contains more than 55% paraffinic, less than 10% olefinic, less than 35% aromatic hydrocarbons. Steam reforming of aromatic hydrocarbons requires a higher temperature than that of paraffinic hydrocarbons. In addition, steam reforming of olefinic and aromatic hydrocarbons existing in gasoline also require a higher $H_2O/C$ ratio than that required by iso-octane to avoid the coke formation and subsequent catalyst deactivation. The results of recent tests have shown that a $H_2O/C$ ratio of about 4.0 to 4.5 and temperature above 835° C. may be required for the complete conversion (to $C_1$ product) of gasoline.

EXAMPLE 10

Sulfur Bearing Diesel Fuel and Natural Gas Reforming 3.0 grams of ITC-6 catalyst was used for steam reforming of ultra low diesel fuel also obtained from Chevron Phillips Chemicals. This diesel fuel contains >65% paraffinic, <5% olefinic, >20% aromatic hydrocarbons, with less than 5 ppm sulfur. Water flow rate was 0.83 to 1.4 g/min. and temperature was 850° C. The impact of $H_2O/C$ was also examined for steam reforming of ultra low diesel. At a $H_2O/C$ ratio of 3.0, the hydrogen concentration was just under 70% on a dry basis. At the same $H_2O/C$ ratio the concentration of CO and $CO_2$ were about 25% and less than 10%, respectively, on a dry basis. With an increasing $H_2O/C$ ratio, both hydrogen and $CO_2$ concentrations increased, while CO concentration decreased. At $H_2O/C$ ratio of about 5.6, the CO and $CO_2$ concentration were about the same, and hydrogen concentration was about 70%.

Figure 10:
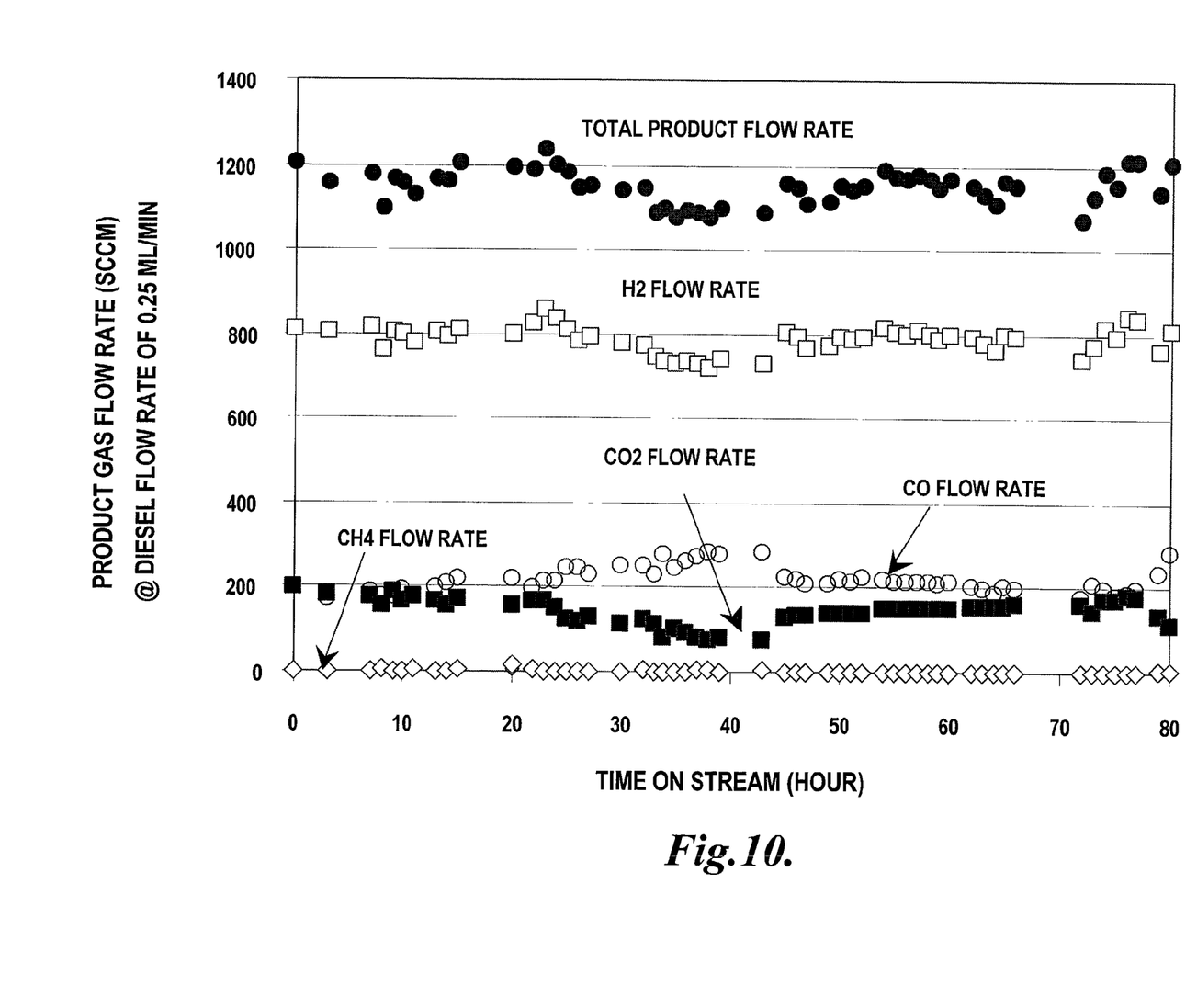
FIG. 10 graphically illustrates the results of steam reforming of ultra-low sulfur diesel using ITC-6.

The product gas flow rate for an 80-hour test with ultra-low sulfur diesel is shown in FIG. 10. Due to variations in the feed rate of diesel (0.16 to 0.30 g/min.), measured reformate flow rates were corrected to a constant feed rate of 0.25 ml/min. At this feed rate, about 800 sccm hydrogen was produced. Total gas flow rate was about 1200 sccm. The variation of flow rates at about 40 hours was due to the change of $H_2O/C$ ratio.

The test results have shown ITC-6 bimetallic catalyst has very high catalytic activity and selectivity to hydrogen production. The sulfur concentration existing in this ultra low sulfur fuel did not poison the catalyst during the 80-hour test.

Figure 11:
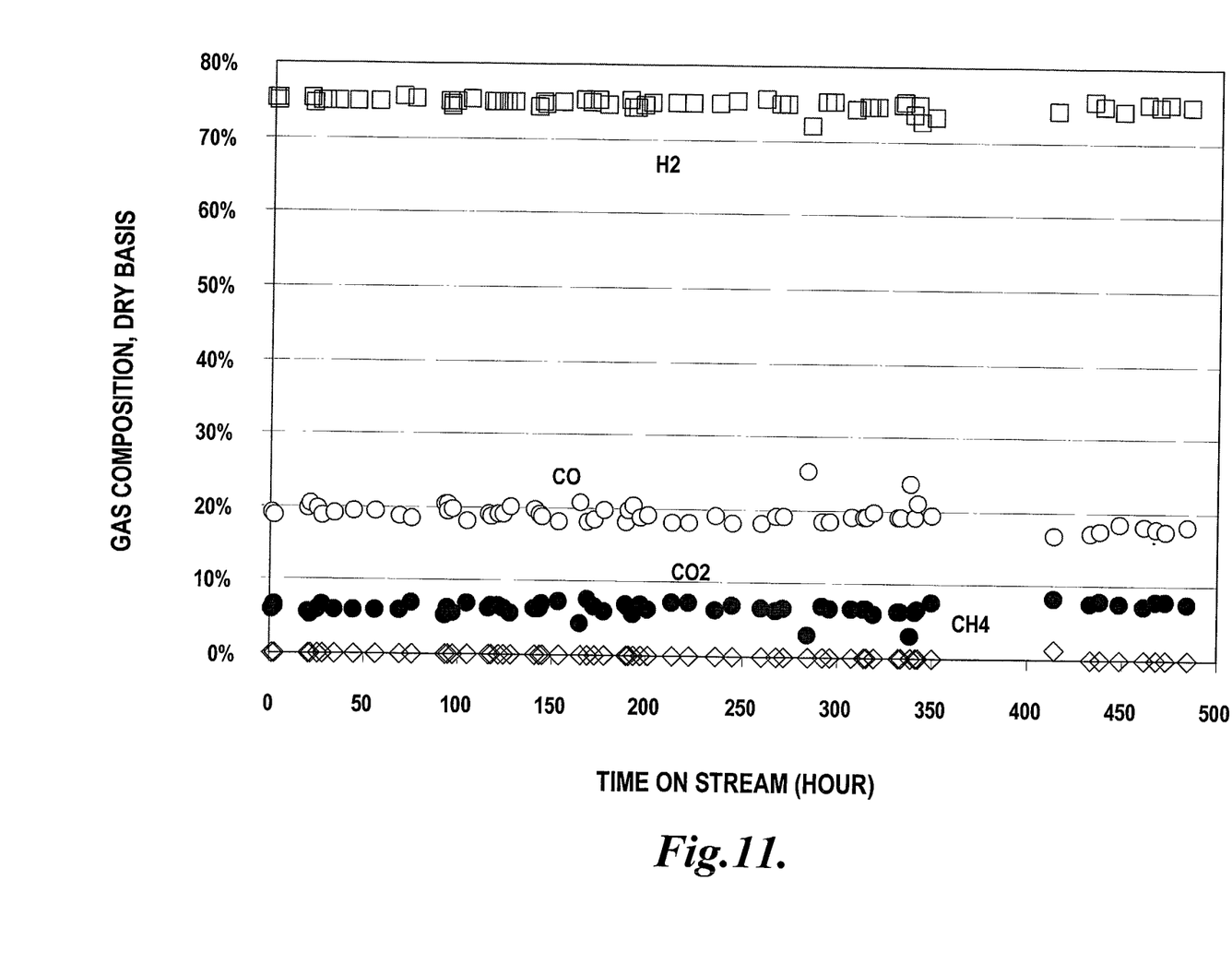
FIG. 11 graphically illustrates the product gas compositions resulting from steam reforming of sulfur bearing natural gas using ITC-6.
Figure 12:
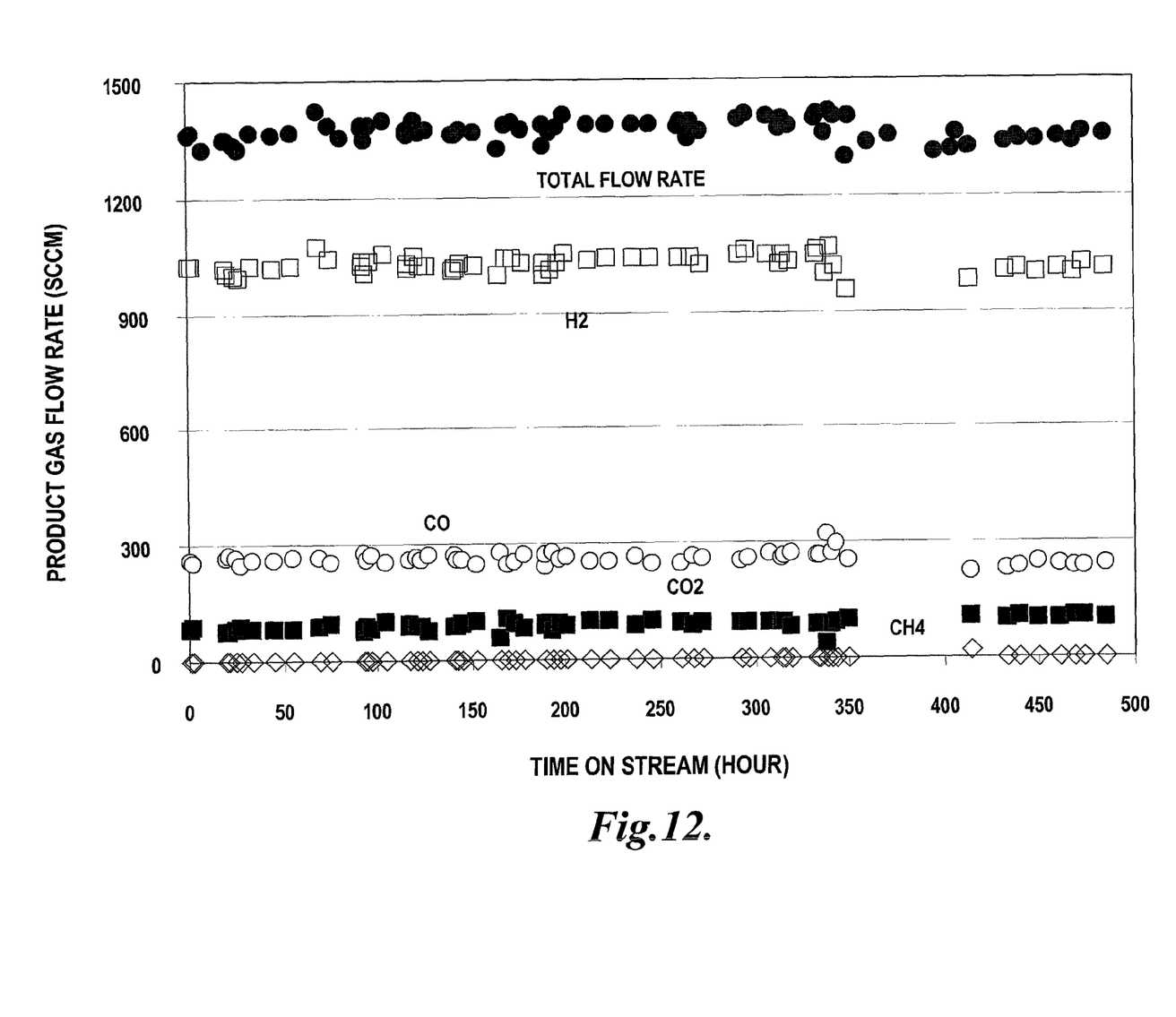
FIG. 12 graphically illustrates the product gas flow rates resulting from steam reforming of sulfur bearing natural gas using ITC-6.

4 grams of the catalyst was also tested for the steam reforming of natural gas. The natural gas was obtained from Oxarc (Pasco, Wash.) and it has about 93.5 vol % $CH_4$ and a small amount of sulfur (Butyl mercaptans $C_4H_{10}S$, less than 30 ppm, Methyl ethyl sulfide $C_2H_6S$, less than 3 ppm, and Hydrogen sulfide $H_2S$, less than 5 ppm). The flow rate of natural gas was 350 ml/min. The reaction temperature was set to be 850° C. and $H_2O/C$ ratio was 3.0. The natural gas hourly space velocity of this test was 19,200 $hr^{-1}$. The hydrogen concentration was over 74% a dry basis. CO and $CO_2$ concentrations were about 19% and 6%, respectively. No methane and other HCs were detected, indicating 100% conversion during the entire testing period. The test was continuously conducted for 341 hours at the same conditions (850° C., $H_2O/C=3.0$). FIGS. 11 and 12 show the product gas compositions and product gas flow rates for the entire test period. The catalyst was continuously tested at 800° C. for another 144 hours, showing very stable performance.

The invention claimed is:

1. A catalyst for use in the steam reforming of hydrocarbons comprising:
   at least two elements selected from the group consisting of elements of Group VIII of the Periodic Table on a ceramic support structure, the ceramic support structure comprising at least 76 weight percent aluminum oxide mixed with $CeO_2$, YSZ, or $ZrO_2$; and
   an alkali metal.

2. The catalyst of claim 1, wherein the at least two elements are platinum and ruthenium.

3. The catalyst of claim 2, wherein the ratio of platinum to ruthenium ranges from 1000:1 to 0.001:1.

4. The catalyst of claim 2, wherein the catalyst comprises alloys of platinum and ruthenium, or their solid solution.

5. The catalyst of claim 2, wherein platinum is present in an amount ranging from about 0.1 to about 5.0 weight percent.

6. The catalyst of claim 2, wherein ruthenium is present in an amount ranging from about 0.1 to about 5.0 weight percent.

7. The catalyst of claim 2, wherein cerium oxide is present in an amount ranging from about 0.1 to 99.9 weight percent.

* * * * *

UNITED STATES PATENT AND TRADEMARK OFFICE
CERTIFICATE OF CORRECTION

PATENT NO. : 7,067,453 B1  
APPLICATION NO. : 10/197618  
DATED : June 27, 2006  
INVENTOR(S) : Q. Ming et al.

Page 1 of 1

It is certified that error appears in the above-identified patent and that said Letters Patent is hereby corrected as shown below:

| COLUMN | LINE | ERROR |
| --- | --- | --- |
| (75) Title Pg. 1, col. 1 | Inventors | delete --Todd Healey, Richland, WA (US);-- |
| (56) Title Pg. 1, col. 2 | Refs. Cited (U.S. Pats., Item 9) | "Lomax et al." should read --Lomax, Jr. et al.-- |
| (56) Title Pg. 1, col. 2 | Refs. Cited (U.S. Pats., Item 10) | "6,623,719   B1" should read --6,623,719   B2-- |
| (56) Title Pg. 1, col. 2 | Refs. Cited (U.S. Pats., Item 10) | "Lomax et al." should read --Lomax, Jr. et al.-- |
| (56) Title Pg. 1, col. 2 | Refs. Cited (U.S. Pats., Item14) | "Lomax et al." should read --Lomax, Jr. et al.-- |
| 1 | 15-16 | delete "Contract No. DAAD05-99-0-7014, awarded by the U.S. Army, and" |
| 1 | 17 | "DE-FC36-996O10452," should read --DE-FC36-996GO10452,-- |

Signed and Sealed this

Third Day of June, 2008

JON W. DUDAS  
*Director of the United States Patent and Trademark Office*